United States Patent [19]

Myneni

[11] Patent Number: 5,343,740
[45] Date of Patent: Sep. 6, 1994

[54] HIGH SENSITIVITY LEAK DETECTION METHOD AND APPARATUS

[75] Inventor: Ganapatic R. Myneni, Grafton, Va.

[73] Assignee: Southeastern Universities Research Association, Newport News, Va.

[21] Appl. No.: 113,718

[22] Filed: Aug. 27, 1993

[51] Int. Cl.$^5$ .............................................. G01M 3/20
[52] U.S. Cl. ....................................................... 73/40.7
[58] Field of Search ........................................ 73/40.7

[56] References Cited

U.S. PATENT DOCUMENTS 4,593,530  6/1986  Longsworth .................... 73/40.7 X

FOREIGN PATENT DOCUMENTS 1552026  3/1990  U.S.S.R. ................................. 73/40.7

Primary Examiner—Hezron E. Williams
Assistant Examiner—Joseph W. Roskos

[57] ABSTRACT

An improved leak detection method is provided that utilizes the cyclic adsorption and desorption of accumulated helium on a non-porous metallic surface. The method provides reliable leak detection at superfluid helium temperatures. The zero drift that is associated with residual gas analyzers in common leak detectors is virtually eliminated by utilizing a time integration technique. The sensitivity of the apparatus of this disclosure is capable of detecting leaks as small as $1 \times 10^{-18}$ atm cc sec$^{-1}$.

20 Claims, 2 Drawing Sheets

HIGH SENSITIVITY LEAK DETECTION METHOD AND APPARATUS

The United States may have certain rights to this invention, under Management and Operating Contract DE-AC05-84ER40150 from the United States Department of Energy.

FIELD OF THE INVENTION

This invention relates to leak detectors of the type that employ a gas such as helium as a tracer to detect the integrity of a sealed vessel or confined space. Typically a cryopump of one or several stages or other technique is used to freeze out or remove one or several gases from the enclosed vessel and then the remaining gas is analyzed by a mass spectrometer. This particular invention relates to an improved leak detector that employs a cyclic adsorption and desorption of helium on a non-porous metallic surface between 9 K or lower and 10 K to 20 K to improve the sensitivity to as much as $10^{-18}$ atm cc sec$^{-1}$.

BACKGROUND OF THE INVENTION

Presently, there are several methods of detecting leaks in objects. Some of these methods consist of enclosing the object to be tested in an enclosed, hermetically sealed vessel and exposing the sealed volume to the "tracer" gas, or gas to be detected. Helium is commonly employed as a tracer gas. A mass spectrophotometer, in contact with the atmosphere inside the enclosed volume, is then used to detect any helium. If any helium exists in the test chamber, it is assumed to have leaked from the test object.

U.S. Pat. No. 4,608,866 discloses a leak detector using a cryogenic pump which is kept at a temperature of about 16 K to about 22 K and is in a range to adsorb the nitrogen from the system. There is nothing in U.S. Pat. No. 4,608,866 indicating the present invention's main novel feature which is a cyclic adsorption and desorption of the accumulated helium on a cold non-porous metallic surface between 9 K or lower and 10 K to 20 K after other stages of a cryopump have removed other gases. U.S. Pat. No. 4,608,866 sets forth a leak detection sensitivity up to $10^{-12}$ atm cc sec$^{-1}$.

U.S. Pat. No. 4,785,666 is another leak detector but the range for the coldest section is mentioned as 10 K to 22 K. The sensitivity of this invention is set forth as up to about $10^{-12}$ atm cc sec$^{-1}$.

U.S. Pat. No. 4,593,530 shows a leak detection system that has an enhanced sensitivity, to $7 \times 10^{-12}$ atm cc sec$^{-1}$. It discloses the use of multiple surfaces to remove different gases from the vacuum environment by cryogenic pumping such as removing water and carbon dioxide by freezing out in a temperature range of 40 K to 120 K, freezing out nitrogen, oxygen, argon, $CO_2$, methane, and halogenated hydrocarbons between 10 K and 25 K, and freezing helium, hydrogen, and neon at temperatures between 2 K and 10 K. Also it discloses cryosorptions for adsorbing gases especially He by finely divided charcoal which desorbs the He when warmed to 20 K. U.S. Pat. No. 4,593,530 thus uses a finely divided adsorbent material for adsorbing helium. This is considerably different from the present invention that teaches cyclic adsorption and desorption of accumulated helium from a non-porous solid metallic surface.

SUMMARY OF THE INVENTION

A new, high sensitivity leak detection method and apparatus has been developed for reliable leak-checking of superconducting radio frequency (SRF) acceleration cavity pairs and other similar applications. This new leak-detection method and apparatus has a higher sensitivity, about $10^{-15}$ atm cc sec$^{-1}$, than most existing conventional leak detectors. The sensitivity can be increased to $10^{-18}$ atm cc sec$^{-1}$ by increasing the integration time involved in the test.

OBJECTS AND ADVANTAGES

Accordingly, several objects and advantages of this invention are:

(1) to provide a leak detector that is several orders of magnitude more sensitive than most commercially available leak detectors. The highest sensitivity available with most present-day leak detectors is $1 \times 10^{-12}$ atm cc sec$^{-1}$. The leak detector of this invention with a one minute integration time period may achieve a sensitivity of $1 \times 10^{-15}$ atm cc sec$^{-1}$. The sensitivity may be improved to $1 \times 10^{-18}$ atm cc sec$^{-1}$ by increasing the integration time interval.

(2) to provide a leak detection method and apparatus that utilizes the cyclic adsorption and desorption of accumulated helium on a non-porous thermally conducting surface such as a copper plate. Other similar conductive non-porous material may be used.

(3) to virtually eliminate the zero drift that is associated with a residual gas analyzer in common leak detectors by utilizing the integration technique.

DESCRIPTION OF THE INVENTION

A new high sensitivity leak detection method and apparatus has been developed for the superconducting radio frequency (SRF) acceleration cavities for a new linear accelerator (linac). The vacuum integrity of the SRF cavity pairs and the associated indium-sealed vacuum flanges is essential for the successful operation of the accelerator. These SRF cavity pairs are immersed in superfluid helium to minimize RF heat load to the cryogenic system. Most conventional leak detection techniques are not appropriate to leak check these cavity pairs at superfluid helium temperature (4.2 K to 2 K), since helium will be adsorbed onto the cavity surfaces. This invention enables leak checking of a cavity pair, an RF window flange, or any similar enclosed volume to higher sensitivity of $10^{-18}$ atm cc sec$^{-1}$.

Figure 1:
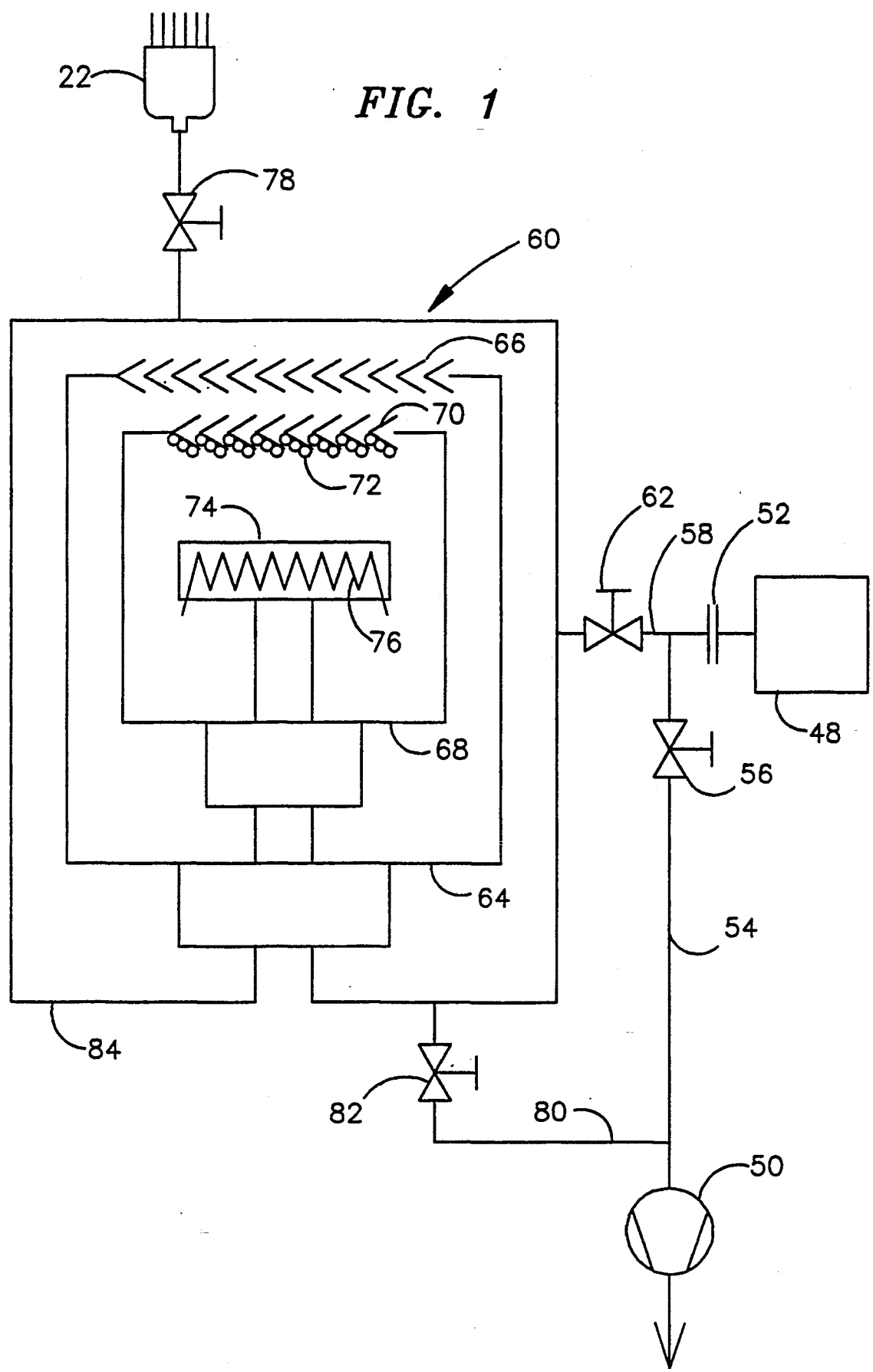
FIG. 1 is a schematic representation of a preferred embodiment of this invention showing a cryo-cooler with two stages.

With reference to FIG. 1, there is shown a schematic representation of a preferred embodiment of this invention. A test piece 48 is connected to a vacuum pump 50 through a connector 52, a vacuum line 54, and a valve 56. In this case, the test piece, which is usually in the form of an enclosed vessel such as a wave guide or the like, is surrounded by a bag into which helium is introduced in the well known manner. The bag may alternately be a metallic container or other similar arrangement and the helium that leaks through the test piece to its inside, which is held at vacuum pressures, is what is measured to determine leakage. Alternately, the test piece can have helium inside and a surrounding vessel held at vacuum pressures so its leaking helium escapes from the inside of the vessel to the surrounded evacuated chamber.

A vacuum line 58 connects the test piece to a scavenger module which is preferably a cryopump 60 through a valve 62. The cryopump 60 nests a sequence of cold surfaces or shields which have decreasing temperatures. The first stage or shield 64, is held at approximately 70 K, at which temperature water vapor, carbon monoxide, carbon dioxide, and other gases with freezing points of 70 K and higher freeze onto the surface. This is called pumping since the gases are in effect pumped from the surrounding atmosphere. Those remaining gases migrate through the cooled baffles 66, of the first shield 64 to the second shield 68, which is cooled to a temperature of approximately 20 K, where hydrogen, nitrogen, oxygen, etc. freeze out onto the surfaces. The baffles 70 of the second shield 68, have on their underside a coating of porous carbon 72 which is maintained at the same temperature as the second shield and serves to adsorb hydrogen. The porous carbon 72 is preferably activated carbon type PE 12×30 available from Barnebey and Sutcliffe Corporation, 835 N. Cassady Ave., Columbus, Ohio 43219. Thus substantially all of the gases in the atmosphere in the cryopump have been removed or scavenged except for helium.

A non-porous metallic or other thermally conducting surface such as a copper plate 74, containing a heater 76, is cycled for predetermined periods between 9 K or lower and 10 K to 20 K. At 9 K or lower, the non-porous metallic surface 74 adsorbs/freezes the helium from the atmosphere. When the heater is turned on to raise the non-porous metallic surface 74 to between 10 K and 20 K, the helium is desorbed/gasified and, in the gaseous state, passes through valve 78 located in a conduit between cryopump 60 and the residual gas analyzer (RGA) 22. The RGA is used to measure the helium. The metallic surface is cooled back down by the source of cooling provided by the cooled scavenger module.

The vacuum pump 50, may be connected through vacuum line 80, to the cryopump 60 through valve 82. The RGA 22 is a typical mass spectrometer type. A preferred RGA sensor is Type PPT-050EM available from the MGS Division of MKS Instruments, Inc., 24 Walpole Park South, Walpole, Mass. 02081 or the EXM Series from Extrel Mass Spectrometry, 575 Epsilon Dr., Pittsburgh, Pa. 15238. When used to sense the leaking helium the active volume primarily is the RGA test unit and cryopump as the other components of the system are closed off through various valves such as valves 56 and 82.

When operating the leak detector of FIG. 1, the cryocooler is maintained in a vacuum vessel 84, which is maintained at room temperature on the exterior. Valves 62 and 82 are closed and valve 56 is opened so that when the test piece 48 is connected it may be evacuated by mechanical pump 50 through vacuum line 54 and open valve 56. It is evacuated by the mechanical pump 50, to $10^{-5}$ Torr. The mechanical pump 50 may be a standard molecular drag pump or an ion pump or a combination of the two. A preferred pump is a TSD020 Molecular Drag Pump Station available from Balzers, 8 Sagamore Park Road, Hudson, N.H. 03051.

After the vacuum has been achieved valve 56 is closed and valve 62 is open as well as valve 78. The test piece 48 is bagged (bag not shown) and helium introduced to the exterior of the test piece inside the bag. The vacuum in the test piece causes the surrounding helium to leak through any leaks into the interior of the test piece and the cryocooler 60.

The cryo-cooler has had its various stages previously cooled to 70 K for the first stage 64 and 20 K for the second stage 68. The copper plate 74 has been cooled to 9 K or lower. The valve 78 between the RGA and cryocooler 60 is open. Under these conditions the $H_2O$, CO, $CO_2$, and other gases that freeze at 70 K or higher will freeze out on the first stage shield especially at the baffles 66. The remaining gases, except for helium, which primarily are $H_2$, $N_2$, and $O_2$ freeze out or adsorb on the second stage shield maintained at approximately 20 K and including the porous activated carbon 72 affixed to the underside of the baffle 70. Thus all the gases other than helium are frozen or adsorbed out of the system by the first stage and second stage shields.

As another alternative, the outer shield 64 can be eliminated and only a single stage shield 68 maintained at approximately 30 K. This shield with the activated carbon adsorber pumps $H_2$, and the top part of the baffle held at 30 K pumps $N_2$, $O_2$, $H_2O$, CO, $CO_2$, etc.

The cryopump is maintained at its low temperatures by well known methods using liquid helium which is not shown in FIG. 1.

The copper plate is cooled to its low temperatures by liquid helium which is not shown. The copper plate when initially maintained at 9 K or lower adsorbs/freezes the helium at the surface of the copper plate 74 and this adsorption is permitted to continue for a predetermined period of time, for example one minute. Then the copper plate is heated by the heater 76 to 10 K to 20 K at which point the helium desorbs or gasifies off of the copper plate and migrates to the RGA where the partial pressure thereof is indicated. The helium desorption takes place for approximately one minute and then the copper plate 74 is again cooled to 9 K or lower for approximately one minute to adsorb the helium and then again heated to 10 K to 20 K for one minute to desorb/gasify the helium. This cycle is repeated for a desired number of times; at least five times and usually approximately ten times. The length of the cycle of adsorption and desorption can be changed as appropriate and the number of cycles can likewise be changed. The longer the test period and the longer the integration time and accumulation of helium, the more sensitive is the testing for leaks.

Figure 2:
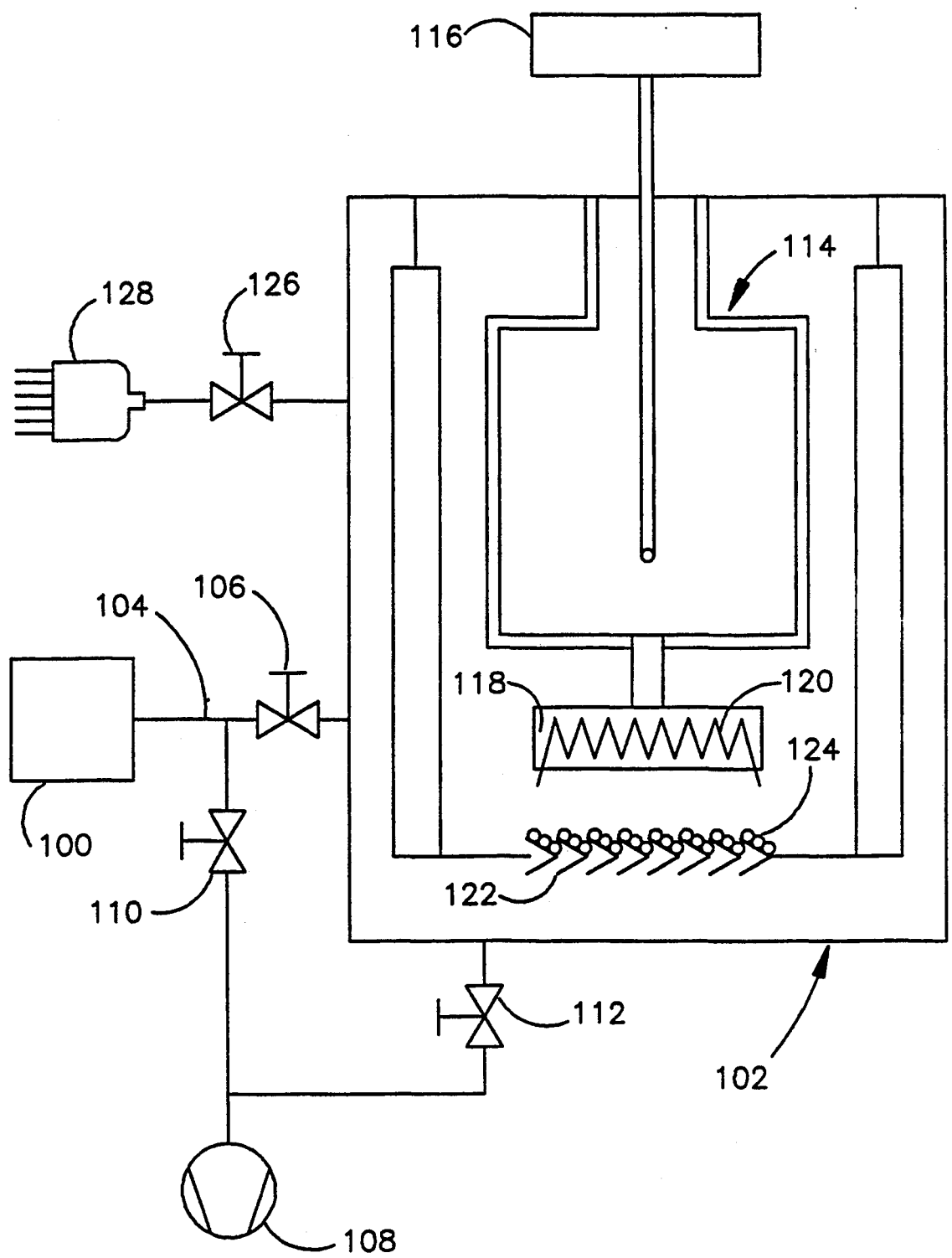
FIG. 2 is a schematic representation of another embodiment of this invention which utilizes a getter pump.

With reference to FIG. 2, there is shown still another embodiment of the present invention. A test piece 100 is connected to a sealed container 102 through a vacuum line 104 and valve 106. A mechanical vacuum pump 108 is connected to the vacuum line 104 by valve 110 and connected to the sealed container 102 by valve 112. Inside of sealed container 102 is a small dewar 114 that is insulated and contains liquid helium. A small closed cycle helium refrigerator 116 is connected to the small dewar 114 and liquefies the helium that boils off of the small dewar. Also connected to the small dewar 114 is a non-porous copper plate 118 which contains a heater 120. A baffle 122 with cold surfaces maintained at 30 K has on its innermost surface a $H_2$, or hydrogen molecule, getter 124, which at the 30 K temperature scavenges the hydrogen. The hydrogen getter is of a type available from SAES Getters/USA, Inc., 1122 E Cheyenne Mountain Boulevard, Colorado Springs, Colo. 80906 as the HYCOTRAP(TM). The cold baffle 122 acts as a cryopump for $H_2O$, CO, $CO_2$, $N_2$, $O_2$, Ar, etc.

Also connected to the sealed container 102 through valve 126 is the RGA 128.

In operation the embodiment of FIG. 2 is utilized similar to the embodiment of FIG. 1. The test piece 100 is connected to the system of vacuum line 104 and valve 106 and valve 112 are closed. The mechanical vacuum pump is then utilized to evacuate the test piece to preferably at least $10^{-5}$ Torr at which time the valve 110 is closed as well as valve 112 and valve 106 is opened. The gas leaking into the test piece 100 from the surrounding helium migrates to the sealed container 102 where it is pumped by the cold surfaces of baffle 122 with the hydrogen being gettered by getter 124. Thus substantially all the gases are scavenged from the system except for helium. The helium is cyclically adsorbed and desorbed on the non-porous thermal plate 118, preferably copper, by the process of cooling and heating as utilized in the embodiment of FIG. 1 with the number of cycles and length of cycles predetermined by the user. Again, the longer the integration period, determined by the length of the test, the greater the sensitivity of the system. During desorption, when the helium is gasified, it migrates through valve 126 to the RGA 128 where the helium is measured. When the helium is adsorbed on the surface of the copper plate 118, there is no helium to be measured.

The invention is especially usable for the components utilized in a continuous electron beam accelerator where windows, waveguides, superconductivity, high vacuums, and cryogenic temperatures are involved. The vacuum integrity of all the seals is of paramount consideration and the components are preferably assembled using a class 100 clean room environment with indium wire seals, optimized torquing procedures, etc. The system must be cycled a number of times between cryogenic temperatures and room temperature with a required leak rate no higher than $2 \times 10^{-10}$ atm cc $\sec^{-1}$ at 293 K in liquid helium. To insure long term reliability of this system, leak checking at a higher sensitivity such as provided by the present invention is very important. The present invention can be utilized to measure leaks in components such as waveguide seals, window seals, etc.

As described above, the leak detector of the present invention is capable of measuring leaks in a relatively simple manner at levels of sensitivity not believed to be heretofore achieved. While the invention is of special use with continuous electron beam accelerators utilizing superconductivity, high vacuum, and cryogenic temperatures it is also usable in many other industrial and scientific applications where a high sensitivity leak detector is desirable.

While there has been shown described what is at present considered the preferred embodiment and alternative embodiments of the present invention, it will be obvious to those skilled in the art that various changes and modifications may be made therein without departing from the scope of the invention as defined by the appended claims.

What is claimed is:

1. An apparatus for detecting leaks from a test object comprising:
   a vacuum line for connecting to a test station where a test sample may be placed for determining leakage of helium by said test sample;
   a vacuum pump connected to said vacuum line for creating a vacuum at the test station on one side of a test sample being tested in said test station;
   a scavenger module connected to said test station for receiving gases leaking through a test sample in said test station and capable of removing all of said gases except helium;
   a helium adsorber/desorber associated with said scavenger for cyclically adsorbing said helium and desorbing said helium a multiple number of times;
   a non-porous thermally conducting surface in said helium adsorber/desorber on to which said helium will be cyclically adsorbed and desorbed;
   a source of cooling to cool said thermally conducting surface to a temperature of approximately 9 K or lower;
   a heater for said thermally conducting surface to heat said surface to 10 K to 20 K; and
   a residual gas analyzer for measuring the amount of helium present during a desorption cycle.

2. The apparatus of claim 1 wherein said scavenger module contains a cryopump with a surface held at a temperature for freezing all gases except helium and hydrogen and includes a porous adsorber for adsorbing hydrogen, 3. The apparatus of claim 2 wherein:
   said surface of said cryopump is held at approximately 20 K; and
   a second surface of said cryopump is held at a temperature of approximately 70 K for freezing gases that freeze at that temperature, 4. The apparatus of claim 2 wherein said residual gas analyzer is a mass spectrometer and said porous adsorber is carbon.

5. The apparatus of claim 4 wherein said thermally conducting surface is a copper plate.

6. The apparatus of claim 1 wherein said surface of said cryopump is held at a temperature of approximately 30 K.

7. The apparatus of claim 1 wherein:
   said scavenger module contains a cryopump with a cold surface for freezing all gases except helium and hydrogen; and
   a hydrogen molecule getter associated with said cryopump.

8. The apparatus of claim 1 wherein said thermally conducting surface is a copper plate.

9. A method for detecting leaks from a test object comprising the following steps:
   providing a test station;
   placing a test sample on said test station;
   providing a vacuum pump connected to said test station;
   providing a scavenger module for receiving and removing all leaking gases from said test sample except helium with said scavenger module including an associated heated and cooled non-porous thermally conducting surface for adsorbing and desorbing helium;
   drawing a vacuum on said test sample;
   providing helium to leak through the said test sample;
   scavenging all the gases leaking through said test sample except helium;
   adsorbing helium on said non-porous thermally conducting surface held at approximately 9 K or lower;
   desorbing the helium from said non-porous thermally conducting surface by heating said non-porous thermally conducting surface to 10 K to 20 K;
   measuring the amount of helium desorbed from said non-porous thermally conducting surface; and repeating said cycle of adsorbing and desorbing/measuring said helium by cooling and heating said non-porous thermally conducting surface between approximately 9 K or lower and 10 K to 20 K.

10. The method of claim 9 wherein said scavenger module contains a cryopump with a surface held at a temperature for freezing all gases except helium and hydrogen and includes a porous adsorbing hydrogen.

11. The method of claim 10 wherein:
said surface of said cryopump is held at approximately 20 K; and
a second surface of said cryopump is held at a temperature of approximately 70 K for freezing gases that freeze at that temperature.

12. The method of claim 11 wherein said cycle of adsorbing and desorbing/measuring is repeated at least five times.

13. The method of claim 10 wherein said residual gas analyzer is a mass spectrometer and said porous adsorber is carbon.

14. The method of claim 13 wherein said thermally conducting surface is a copper plate.

15. The method of claim 14 wherein said cycle of adsorbing and desorbing/measuring is repeated at least five times.

16. The method of claim 13 wherein said cycle of adsorbing and desorbing/measuring is repeated at least five times.

17. The method of claim 9 wherein said surface of said cryopump is held at a temperature of 10 K to 20 K.

18. The method of claim 9 wherein said scavenger module contains a cryopump with a cold surface for freezing all gases except helium and hydrogen and also contains a hydrogen molecule getter for removing hydrogen.

19. The method of claim 18 wherein said cycle of adsorbing and desorbing/measuring is repeated at least five times.

20. The method of claim 9 wherein said thermally conducting surface is a copper plate.

* * * * *